US012044362B2

(12) United States Patent
Mormile et al.

(10) Patent No.: US 12,044,362 B2
(45) Date of Patent: Jul. 23, 2024

(54) FILLING STATION FOR MEANS OF TRANSPORT

(71) Applicant: GRAF Industries S.p.A., Nonantola (IT)

(72) Inventors: Mario Mormile, Nonantola (IT); Marco Antonino Palella, Nonantola (IT); Andrea Vaccari, Nonantola (IT)

(73) Assignee: GRAF Industries S.p.A., Nonantola (IT)

( * ) Notice: Subject to any disclaimer, the term of this patent is extended or adjusted under 35 U.S.C. 154(b) by 575 days.

(21) Appl. No.: 17/282,412

(22) PCT Filed: Oct. 3, 2019

(86) PCT No.: PCT/IB2019/058415

§ 371 (c)(1),
(2) Date: Apr. 2, 2021

(87) PCT Pub. No.: WO2020/070683

PCT Pub. Date: Apr. 9, 2020

(65) Prior Publication Data

US 2021/0388946 A1 Dec. 16, 2021

(30) Foreign Application Priority Data

Oct. 5, 2018 (IT) ........................ 102018000009221

(51) Int. Cl.
*F17C 5/04* (2006.01)
*F17C 13/02* (2006.01)
(Continued)

(52) U.S. Cl.
CPC ................ *F17C 5/04* (2013.01); *F17C 13/02* (2013.01); *F25J 1/0022* (2013.01); *F25J 1/0035* (2013.01);
(Continued)

(58) Field of Classification Search
CPC ........ F17C 5/04; F17C 13/02; F17C 2203/03; F17C 2205/0323; F17C 2205/0352;
(Continued)

(56) References Cited

U.S. PATENT DOCUMENTS 3,246,478 A * 4/1966 Kornemann ......... F25J 3/04321 62/646
3,878,683 A * 4/1975 Imai .......................... F17C 9/04 60/647
(Continued)

FOREIGN PATENT DOCUMENTS

CA 2819610 A1 * 6/2012 ............ F17C 13/023
GB 197302 A * 8/1923 ............. B01D 3/141
(Continued)

OTHER PUBLICATIONS

International Search Report and the Written Opinion Dated Feb. 12, 2019 From the International Searching Authority Re. Application No. PCT/IB2018/058736. (8 Pages).
(Continued)

*Primary Examiner* — Bob Zadeh

(57) ABSTRACT

The filling station (1) for means of transport (4) comprises:
a supply (2) of a methane pipeline transporting gaseous methane;
a liquefaction assembly (A) connected in a fluid-operated manner to the supply (2) and adapted to liquefy the gaseous methane conveyed by the methane pipeline to obtain liquid methane;
at least one dispenser (3) of the liquid methane, which is connected in a fluid-operated manner to the liquefaction assembly (A) and is connectable in a removable manner to a means of transport (4) to supply the means of transport (4) with the liquid methane.

15 Claims, 6 Drawing Sheets

(51) Int. Cl.
*F25J 1/00* (2006.01)
*F25J 1/02* (2006.01)

(52) U.S. Cl.
CPC ........... *F25J 1/0225* (2013.01); *F25J 1/0257* (2013.01); *F17C 2203/03* (2013.01); *F17C 2205/0323* (2013.01); *F17C 2205/0352* (2013.01); *F17C 2221/033* (2013.01); *F17C 2223/0153* (2013.01); *F17C 2223/0161* (2013.01); *F17C 2227/0157* (2013.01); *F17C 2227/0337* (2013.01); *F17C 2250/0443* (2013.01); *F17C 2265/065* (2013.01); *F17C 2270/0171* (2013.01); *F25J 2230/30* (2013.01); *F25J 2240/02* (2013.01); *F25J 2245/90* (2013.01); *F25J 2260/60* (2013.01); *F25J 2270/908* (2013.01)

(58) Field of Classification Search
CPC ........ F17C 2221/033; F17C 2223/0153; F17C 2223/0161; F17C 2227/0157; F17C 2227/0337; F17C 2250/0443; F17C 2265/065; F17C 2270/0171; F17C 2221/035; F17C 2227/0135; F17C 2265/032; F17C 6/00; F25J 1/0022; F25J 1/0035; F25J 1/0225; F25J 1/0257; F25J 2230/30; F25J 2240/02; F25J 2245/90; F25J 2260/60; F25J 2270/908
See application file for complete search history.

(56) References Cited

U.S. PATENT DOCUMENTS 5,315,831 A * 5/1994 Goode .................... F17C 5/007 137/565.33
5,327,730 A * 7/1994 Myers .................... F25J 1/0022 62/7
5,505,232 A * 4/1996 Barclay .................. F25J 1/0245 141/82
5,687,776 A * 11/1997 Forgash .................... F17C 9/00 141/2
5,771,946 A * 6/1998 Kooy ........................ F17C 6/00 141/2
6,220,052 B1 * 4/2001 Tate, Jr. ................. F25J 1/0281 62/613
6,598,423 B1 * 7/2003 Emmer .................. F25J 1/0022 62/614
2006/0213222 A1 * 9/2006 Whitesell ............... F25J 1/0283 62/612
2013/0112313 A1 * 5/2013 Donnelly .................. F17C 5/06 141/98
2014/0175800 A1 6/2014 Thorp et al.
2016/0013737 A1 1/2016 Villarreal
2016/0047243 A1 * 2/2016 Van De Loo ........... F01L 15/16 91/454
2021/0388946 A1 * 12/2021 Mormile ................... F17C 5/04

FOREIGN PATENT DOCUMENTS

JP 2015507731 * 3/2015
WO WO 2016/116657 7/2016
WO WO-2016132086 A1 * 8/2016

OTHER PUBLICATIONS

Barclay et al. "Distributed Liquefied Natural Gas Infrastructure: Design of the Next Generation of Liquefiers", 21st IIR International Congress of Refrigeration: Serving the Needs of Mankind, XP009121053, Washington, DC, USA, Aug. 17-22, 2003, p. 1-8, Aug. 17, 2003.

* cited by examiner

FILLING STATION FOR MEANS OF TRANSPORT

RELATED APPLICATIONS

This application is a National Phase of PCT Patent Application No. PCT/IB2019/058415 having International filing date of Oct. 3, 2019, which claims the benefit of priority of Italian Patent Application No. 102018000009221 filed on Oct. 5, 2018. The contents of the above applications are all incorporated by reference as if fully set forth herein in their entirety.

FIELD AND BACKGROUND OF THE INVENTION

The present invention relates to a filling station for means of transport.

Filling stations for the distribution of vehicle fuels need to store fuels in temporary storage tanks, from which they are taken to supply customer vehicles. As far as gaseous fuels are concerned, the highest storage efficiency is achieved through liquefaction, which in fact permits significantly reducing the volume of fuels, allowing a much greater mass to be stored, the volume of the storage tanks being equal.

Liquefaction, in the case of fuels such as LPG, can be obtained through intense pressurization, but other so-called cryogenic fuels, including natural gas, necessarily also require cooling at temperatures well below 0° C.

In this regard, it should be noted that natural gas is a gas to be found in nature the main component of which is methane (CH4) but which normally also contains other gaseous hydrocarbons such as ethane (CH3CH3), propane (CH3CH2CH3) and butane (CH3CH2CH2CH3); for the sake of simplicity of presentation, in this treatise the term "methane" will be used to indicate both pure methane and natural gas as a whole.

For the distribution of liquid methane for motor vehicles, filling stations are known which fill up with liquid methane at low temperature by means of tanker trucks, and then store it temporarily in a cryogenic tank, i.e., a thermally-insulated tank at low pressure (close to atmospheric pressure).

The low temperature, needed to keep the methane in the liquid state, is maintained by insulating the tank.

Such tank, however, cannot ensure the same temperature being maintained for an indefinite time, and instead tends to heat up slowly over time, causing the slow evaporation of the liquefied methane.

The evaporating methane, when it reaches an excessively high pressure inside the tank, is released into the atmosphere through a vent valve for safety reasons. Filling stations which dispense liquid methane do have a number of drawbacks, including the fact that this type of storage inevitably results in a huge waste of fuel.

In this respect, another drawback is the fact that a filling station of this type is forced to plan its orders for the supply of liquefied methane very carefully, inasmuch as an excessive quantity entails greater expense due to waste, while an excessively limited quantity exposes it to the risk of not meeting customer requirements: this drawback is even more felt by small filling stations.

Another drawback of known filling stations is the fact that refueling by tanker truck makes it necessary to order a rather high minimum quantity of fuel, so as to cover requirements until the next tanker truck arrives, thus making it more difficult to reduce waste.

Another drawback of this prior art is the fact that, if the filling station sells methane directly in liquid state, the aeriform fraction generated by evaporation inside the cryogenic tank cannot be used in any way, even if a part were to be retained in the tank and not vented into the atmosphere.

SUMMARY OF THE INVENTION

The main aim of the present invention is to provide a filling station for means of transport which makes it possible to considerably reduce the waste of fuel compared to known service stations.

Within the indicated aim, one of the objects of this invention is to permit a supply of liquid methane in a practical, easy and functional way, while at the same time considerably reducing the quantity of liquid methane that needs to be stored.

A further object of the present invention is to permit easier programming of the quantities of fuel to be stored.

Another object of the present invention is to devise a filling station for means of transport that allows overcoming the aforementioned drawbacks of the prior art in the context of a simple, rational, easy, effective to use and affordable solution.

The aforementioned objects are achieved by the present filling station for means of transport according to claim 1.

BRIEF DESCRIPTION OF THE SEVERAL VIEWS OF THE DRAWINGS

Other characteristics and advantages of the present invention will be more evident from the description of a preferred, but not exclusive, embodiment of a filling station for means of transport, illustrated by way of an indicative, but non-limiting example in the accompanying drawings, in which.

DESCRIPTION OF SPECIFIC EMBODIMENTS OF THE INVENTION

Figure 1:
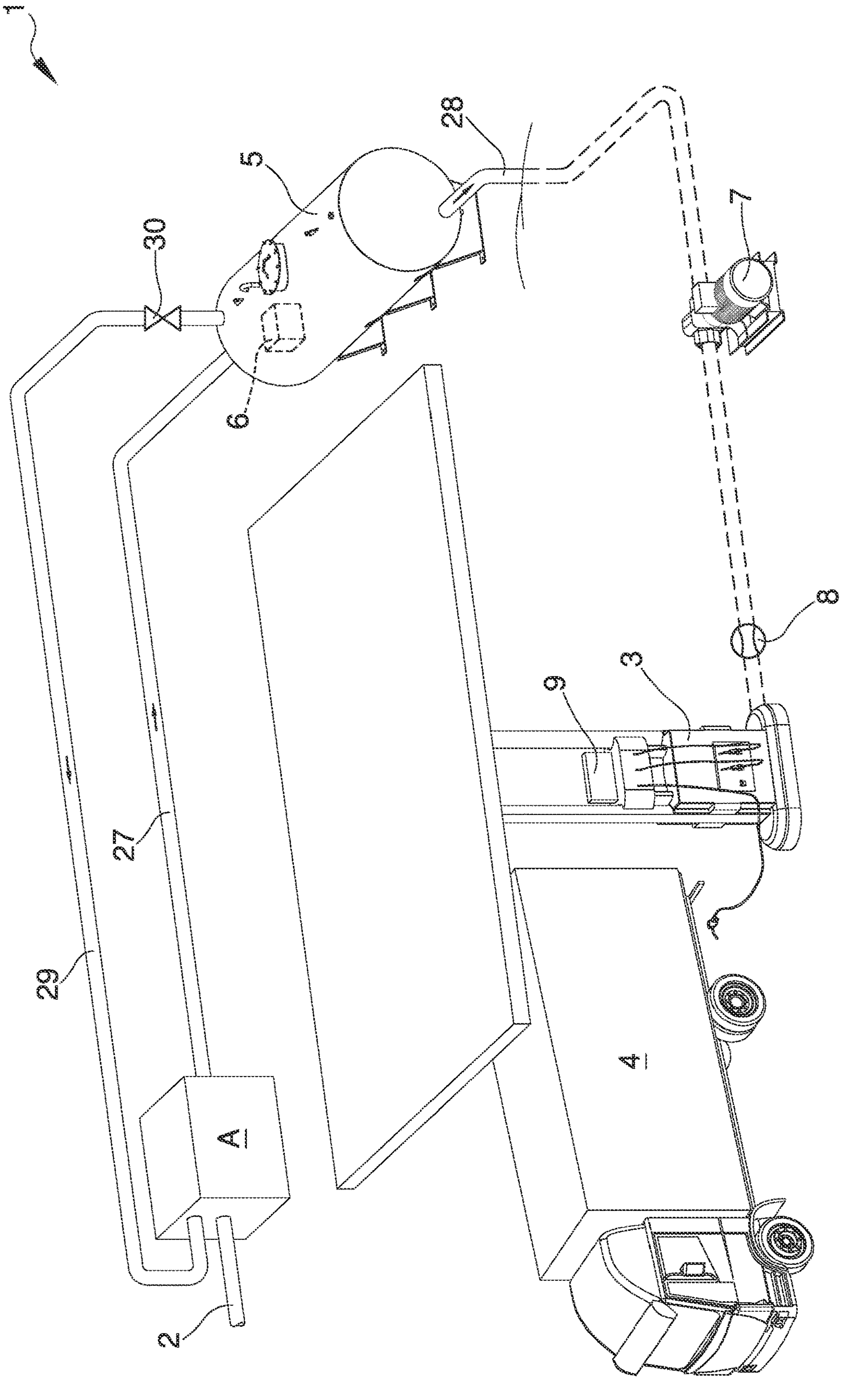
FIG. 1 is a schematic view of the filling station according to the invention.
Figure 2:
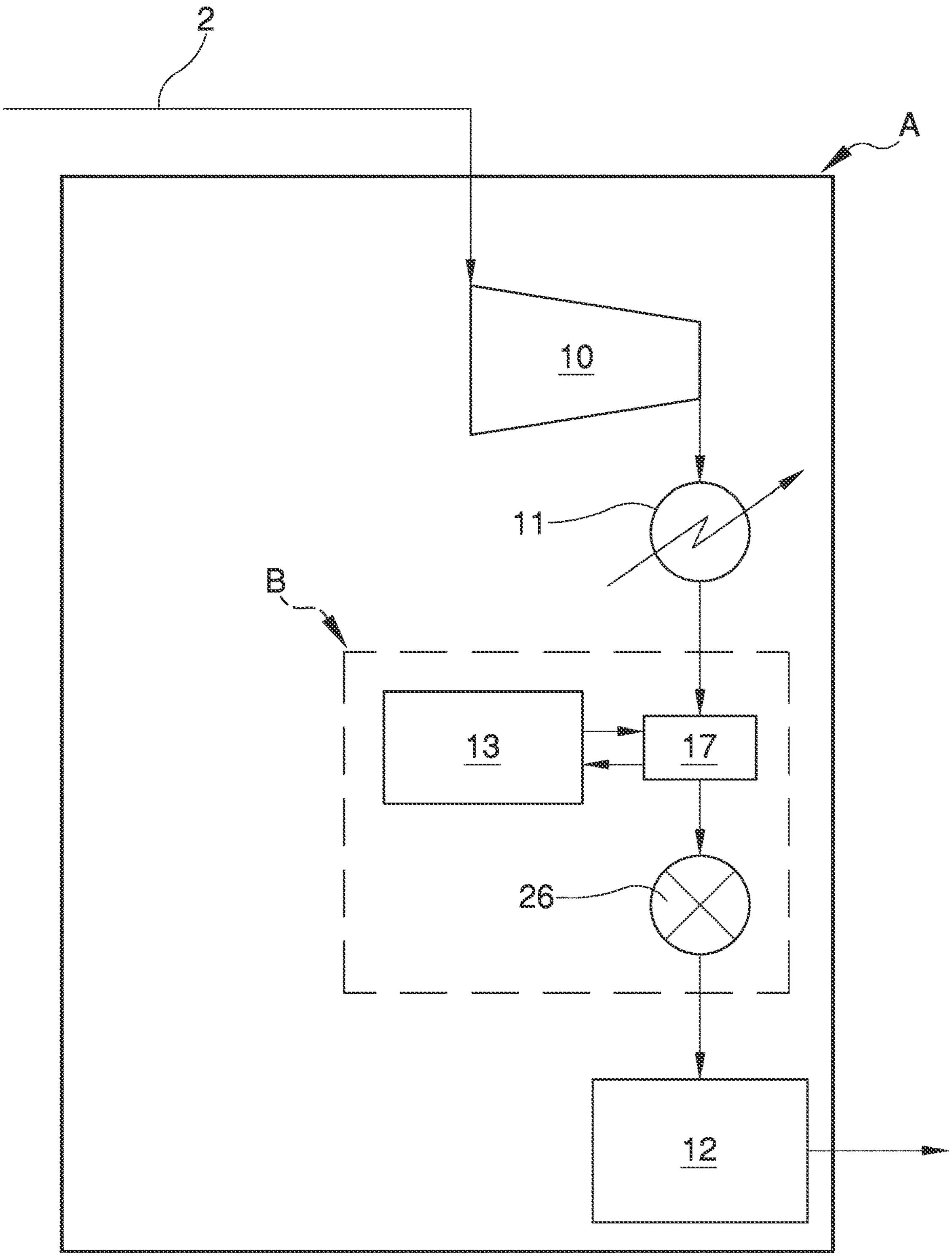
FIG. 2 is a schematic view of the liquefaction assembly provided by the filling station according to the invention.

With particular reference to these figures, reference numeral 1 globally designates a filling station for means of transport.

In the context of the present treatise, the filling station 1 is intended for both private and public use, wherein:

- when for private use, the filling station 1 is intended to supply a limited number of means of transport with fuel, e.g., the means of transport of a company fleet owned by the same company which owns the filling station 1 and which are the only vehicles which have access to the filling station 1;

when for public use, the filling station 1 is accessible to any means of transport and is therefore intended to supply an unspecified number of means of transport with fuel.

The filling station 1 comprises:

a supply 2 of a methane pipeline transporting gaseous methane;

a liquefaction assembly A connected in a fluid-operated manner to the supply 2 and adapted to liquefy the gaseous methane conveyed by the methane pipeline to obtain liquid methane;

a dispenser 3 of the liquid methane, which is connected in a fluid-operated manner to the liquefaction assembly A and is connectable in a removable manner to a means of transport 4 to supply the means of transport 4 with the liquid methane.

The supply, in practice, consists of a section of the normal methane distribution network and is exploited for the production of liquid methane.

The filling station 1, therefore, is not supplied with liquid methane by means of tanker trucks which transport it from a plant dedicated to liquefaction, but is able to produce the liquid methane it needs on site, with the possibility of adjusting the quantity produced according to customers' requirements.

Advantageously, the filling station 1 also comprises a cryogenic storage tank 5 of the liquid methane interposed in a fluid-operated manner between the liquefaction assembly A and the dispenser 3.

The by now liquefied methane, in particular, leaves the liquefaction assembly A through a first pipe 27 to reach the cryogenic storage tank 5, where it can be temporarily stored before being transferred to the dispenser 3 through a second pipe 28.

The function of the cryogenic storage tank 5 is to maintain the temperature and the pressure reached in the liquefaction assembly A, and it is therefore adequately insulated with respect to the external environment.

The possibility cannot furthermore be ruled out of the cryogenic storage tank 5 being provided with a cooling circuit (not shown in the illustrations), so as to avoid changes in the temperature and pressure conditions inside it and completely eliminate the possibility of evaporation of the liquid methane.

Alternatively, or in combination with the cooling circuit, a circuit for the recovery of the gaseous fraction of the methane that evaporates inside the cryogenic storage tank 5 can be usefully provided.

The recovery circuit, e.g., can consist of a pipeline 29, which connects the cryogenic storage tank 5 with the liquefaction assembly A, and a valve assembly 30, which is associated with the pipeline 29 and can be opened, e.g., if the pressure inside the cryogenic storage tank 5 exceeds a threshold value.

This way, the recovery circuit allows the evaporated gaseous methane inside the cryogenic storage tank 5 to come out, transferring it back to the liquefaction assembly A to liquefy it again.

The recovery circuit thus restores the normal temperature and pressure conditions of the liquid methane inside the cryogenic storage tank 5 and completely eliminates fuel waste.

Conveniently, the cryogenic storage tank 5 comprises pressurization means 6 of the liquid methane, which are adapted to pressurize the liquid methane inside the cryogenic storage tank 5 to push it towards the dispenser 3, when the latter is opened.

This embodiment, in particular, is illustrated in FIG. 1; the cryogenic storage tank 5 is pressurized by the pressurization means 6, and the liquid methane flows towards the dispenser 3 thanks to the difference in pressure existing between the cryogenic storage tank 5 and the dispenser 3.

Alternatively or in combination with the pressurization means, the filling station 1 comprises a pumping device 7 interposed in a fluid-operated manner between the cryogenic storage tank 5 and the dispenser 3 and adapted to push the liquid methane towards the dispenser 3.

In the specific embodiment illustrated in FIG. 1, the filling station 1 is provided both with the pressurization means 6 in the cryogenic storage tank 5 and with the pumping device 7 between the cryogenic storage tank 5 and the dispenser 3.

The possibility cannot however be ruled out of providing only the pressurization means 6 or only the pumping device 7, or different means for transferring the liquid methane from the cryogenic storage tank 5 to the dispenser 3.

In this regard, for example, it should be noted that the liquefaction assembly A can be adapted to produce liquid methane already in pressure conditions such as to pressurize the cryogenic storage tank 5, or in any case can be activated to pressurize the liquid methane already present inside the cryogenic storage tank 5.

In the absence of the pressurization means 6 or of the action of the liquefaction assembly A, the cryogenic storage tank 5 is not actively pressurized and, save the effect of evaporation of the liquid methane, its internal pressure remains substantially equal to atmospheric pressure.

Advantageously, the dispenser 3 comprises a flow measurement device 8 of the liquid methane, adapted to measure a quantity of liquid methane which passes through the dispenser 3.

The flow measurement device 8 is passed through and operated by the flow of liquid methane and, e.g., can be of the type of a turbine meter.

Furthermore, the dispenser 3 comprises a reading device 9 for the conversion of the quantity of liquid methane which passes through the dispenser 3 into a sum of money to be paid.

Thanks to the flow measurement device 8 and to the reading device 9, the dispenser 3 detects exactly the quantity of liquid methane supplied to the customers' means of transport 4 and calculates the sum of money to be paid.

Advantageously, the liquefaction assembly A comprises:

a compressor 10 placed in fluidic connection with the supply 2 and adapted to increase the pressure of the gaseous methane;

a (some) cooling device(s) 11 connected in a fluid-operated manner to the compressor 10, adapted to cool the gaseous methane;

an expansion assembly B connected in a fluid-operated manner to the cooling device 11, which is adapted to reduce the pressure of the gaseous methane to obtain liquid methane;

a transfer section 12 connected in a fluid-operated manner to the expansion assembly B and adapted to convey the liquid methane outside the liquefaction assembly A.

In particular, the supply 2 conveys the methane gas to the compressor 10, which compresses it at rather high pressures, even 200 bar.

Afterwards, the still gaseous methane leaves the compressor 10 and is introduced into a cooling device 11: the latter reduces its temperature well below 0° C., being able to reach even around −60° C. to make the subsequent liquefaction possible.

Figure 3:
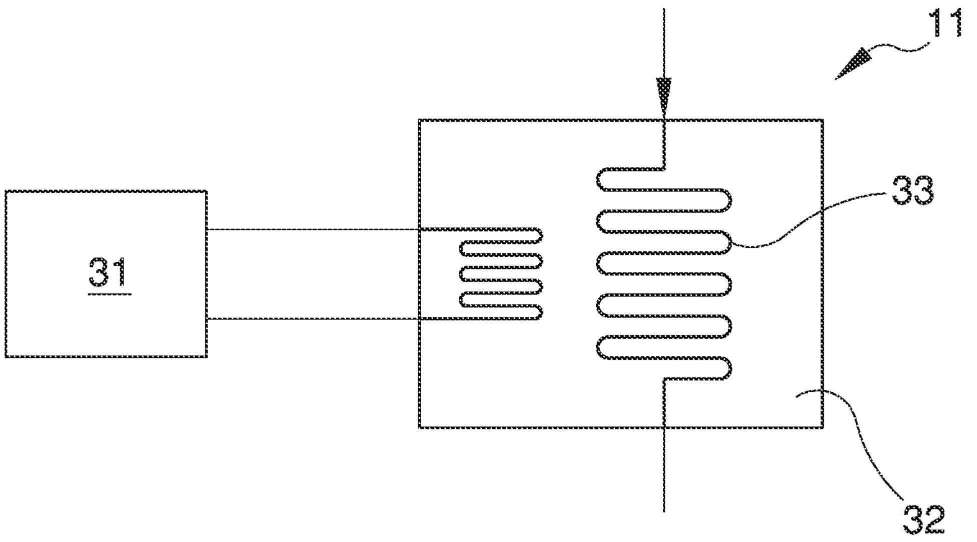
FIG. 3 is a schematic view of an embodiment of the cooling device provided by the filling station according to the invention.

FIG. 3 shows a possible example of cooling device 11, which comprises at least one refrigerant circuit 31, i.e. a thermal machine that implements a cooling cycle involving the compression and expansion of a refrigerant gas so as to transfer heat from a low-temperature environment to a higher-temperature environment.

In this case, the refrigerant circuit 31 is connected to a heat exchanger 32 inside which is a coil 33 in which the gaseous methane flows.

The refrigerant circuit 31 lowers the temperature inside the heat exchanger 32 so as to draw heat from the coil 33 and reduce the temperature of the gaseous methane.

Figure 4:
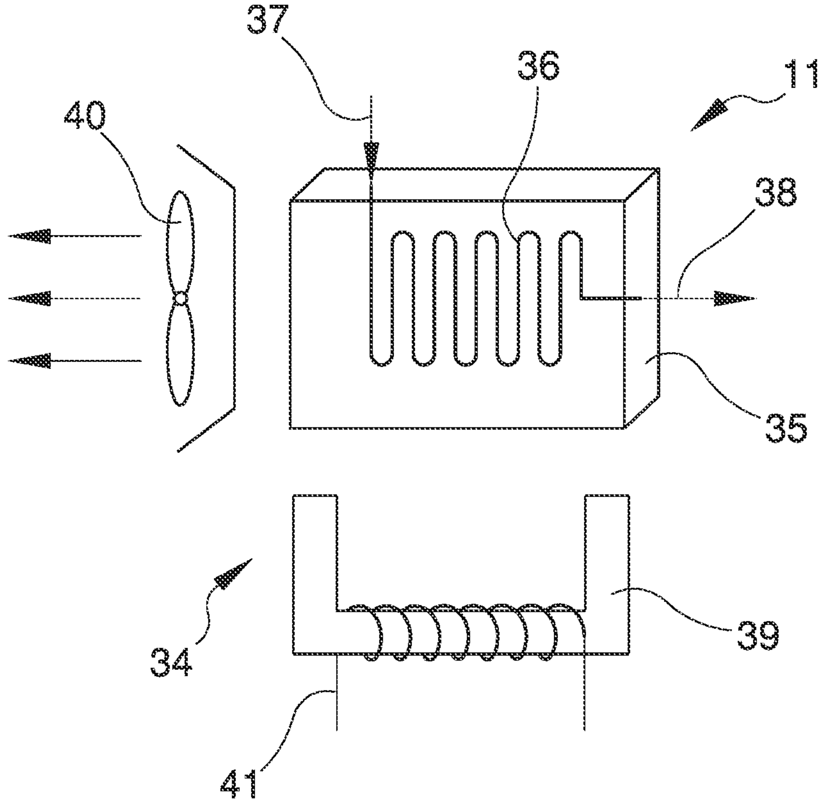
FIG. 4 is a schematic view of an alternative embodiment of the cooling device provided by the filling station according to the invention.

In FIG. 4, on the contrary, an alternative embodiment of the cooling device 11 is shown, which comprises at least one magnetocaloric cooler 34 adapted to exploit a magneto-thermodynamic process, known as the magnetocaloric effect, in which by applying a field magnetic it is possible to change in a reversible way the temperature of a special material, defined magnetocaloric material.

In this case, the magnetocaloric cooler 34 comprises a block of magnetocaloric material 35, inside which a crossing duct 36 is obtained through which the gaseous methane flows from an inlet 37 to an outlet 38.

The magnetocaloric cooler 34 also comprises a magnetic field generator 39, placed in the proximity of the block of magnetocaloric material 35 and adapted to generate a magnetic field which invests the block of magnetocaloric material 35.

The magnetic field generator 39 consists, e.g. of an electromagnet which, excited by a reel 41, generates the magnetic field and which, once the coil is de-energized, interrupts the magnetic field.

The coil, e.g., can be made of a superconducting material which, by exploiting part of the refrigeration units produced by the magnetocaloric cooler 34, is made to operate at a cryogenic temperature and, therefore, with no electrical resistance.

The possibility cannot however be ruled out of the magnetic field generator 39 consisting of a permanent magnet, which can be brought near to the block of magnetocaloric material 35 to expose it to the magnetic field and moved away from the block of magnetocaloric material 35 to brought it back to a non-magnetized condition.

Furthermore, in the proximity of the block of magnetocaloric material 35, a heat extractor 40 is placed, i.e., a device that removes heat from the block of magnetocaloric material 35.

The heat extractor 40 may consist, e.g., of a fan, a refrigerant circuit or other cooling system.

By applying the magnetic field to the block of magnetocaloric material 35 by means of the magnetic field generator 39, the magnetocaloric material heats up by a positive $\Delta T$.

By means of the heat extractor 40, the block of magnetocaloric material 35 is brought back to room temperature, despite remaining under the effect of the magnetic field.

At this point, by interrupting the magnetic field, the magnetocaloric material lowers its temperature by a negative $\Delta T$, which can be exploited to cool the gaseous methane running through the crossing duct 36.

By repeating the process with a predetermined frequency, the gaseous methane can be cooled down to the desired temperature.

It is also easy to appreciate that a technical solution could be particularly convenient wherein two or more blocks of magnetocaloric material are provided for, wherein while the magnetocaloric material of one block is heated, the magnetocaloric material of another block is cooled.

The use of a magnetocaloric cooler 34 instead of a refrigerant circuit 31 means, overall, greater thermal efficiency and a significantly lower cost of production of the liquid methane.

The compressed and cooled methane is now introduced into the expansion assembly B, which considerably reduces its pressure: the reduction in pressure is accompanied by a simultaneous spontaneous lowering of the temperature and the methane reaches a physical state suitable for changing to the liquid state.

Generally, at the end of this expansion phase, a pure liquid is not obtained but rather a mist consisting of a liquid fraction and an aeriform fraction, so it is possible to separate the two fractions and to recover the aeriform one by mixing it with the gas entering the expansion assembly B.

Conveniently, the expansion assembly B comprises a piston expander 13 comprising:

- an expansion chamber 14, which extends along a first axial direction C and is provided with at least one suction and discharge mouth 15; and
- a piston 16 housed in the expansion chamber 14 and movable sliding inside the expansion chamber 14 along the first axial direction C.

The possibility cannot be ruled out of the piston expander 13 being provided with a plurality of expansion chambers 14, each of which comprising a corresponding piston 16 movable sliding inside it.

The compressed and cooled methane is conveyed into the expansion chamber 14, the volume of which is increased by a sliding movement of the piston 16, as shown in the FIGS. 3 and 4.

The piston 16, in fact, is movable sliding along the first axial direction C and defines two work positions: a first position wherein the piston 16 is at a minimum distance from the mouth 15 and wherein the expansion chamber 14 has a minimum volume, and a second position wherein the piston 16 is at a maximum distance from the mouth 15 and wherein the expansion chamber 14 has a maximum volume.

The compressed and gaseous methane is introduced into the piston expander 13 when the piston 16 is in the first position, as shown in FIG. 3.

Afterwards, as shown in FIG. 4, the mouth 15 is closed and the piston 16 is moved to the second position, thus increasing the volume of the expansion chamber 14 and reducing, at the same time, the internal pressure.

By means of this operation, it is possible to obtain partially liquefied methane and the liquid can be separated from the aeriform fraction and collected.

Figure 5:
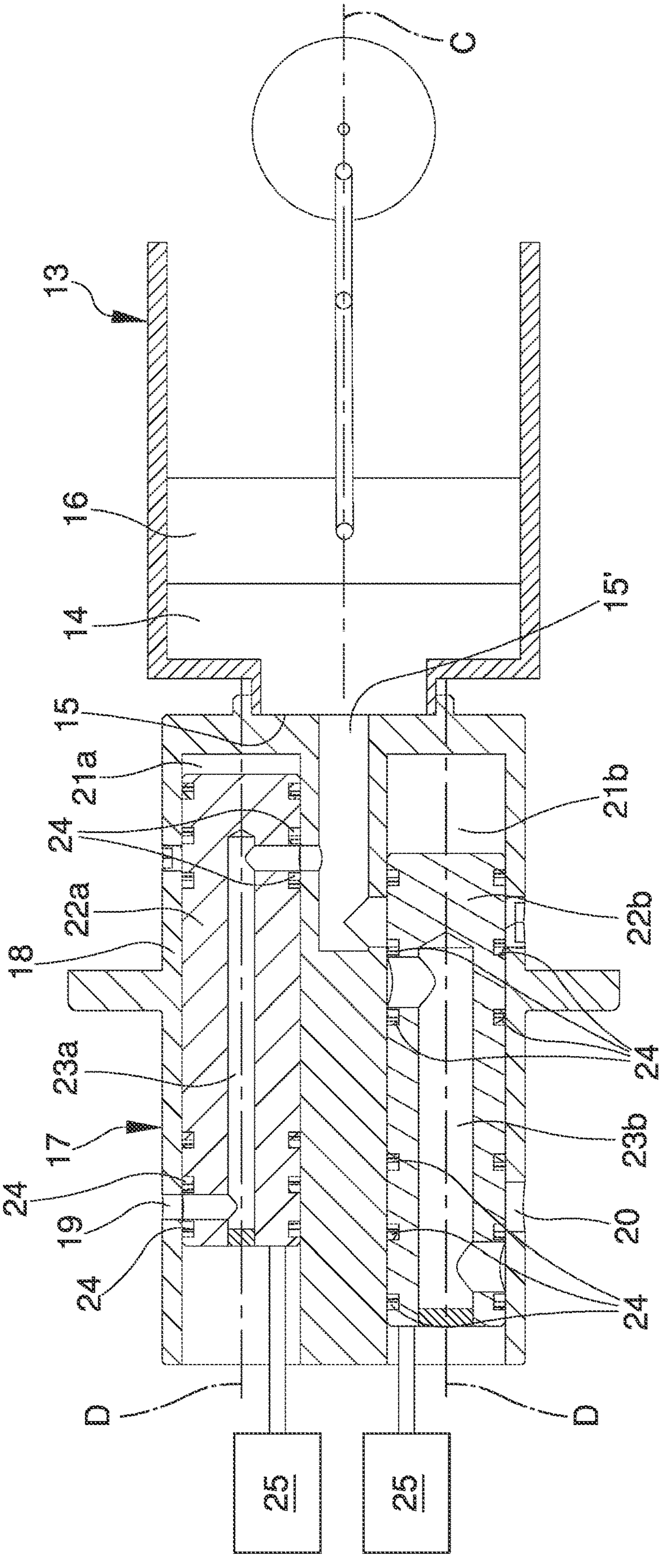
FIG. 5 is a schematic sectional view of a detail of the filling station of FIG. 1 with the fluid-operated distributor in the suction configuration.
Figure 6:
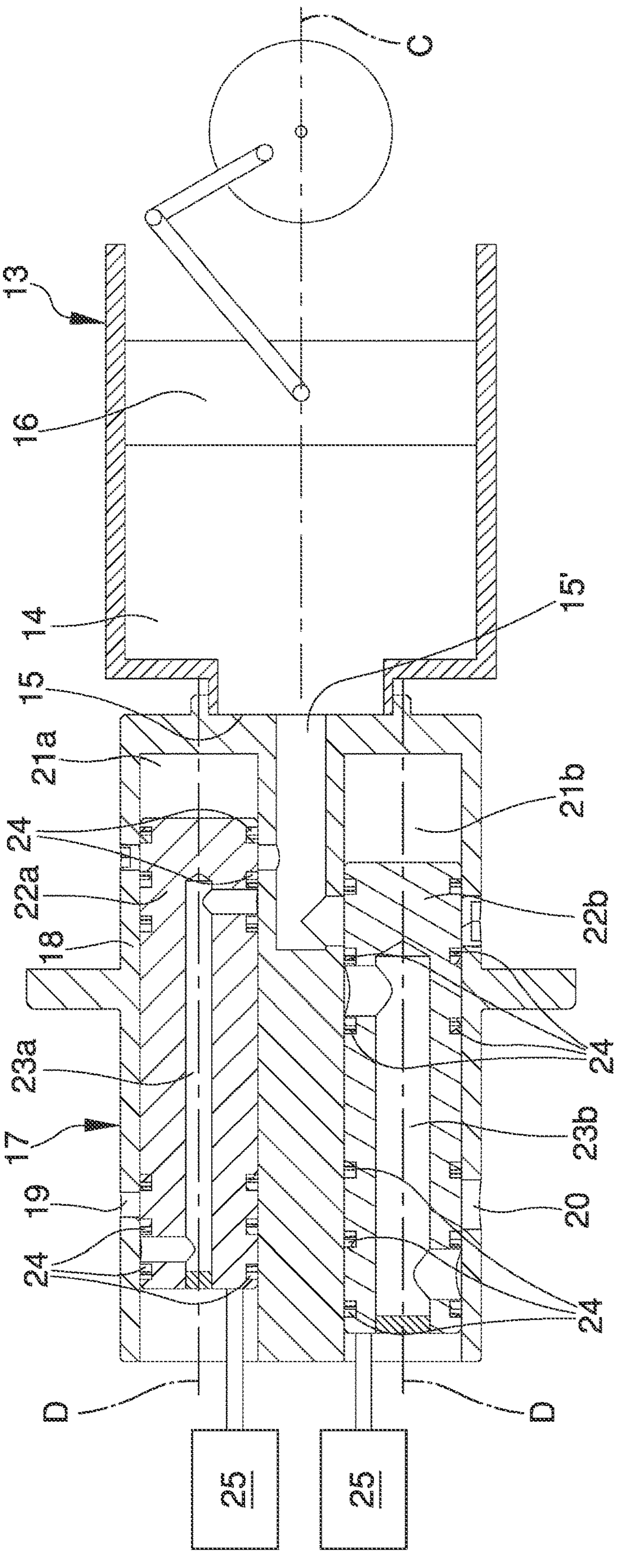
FIG. 6 is a schematic sectional view of the detail of FIG. 5 with the fluid-operated distributor in the expansion configuration.
Figure 7:
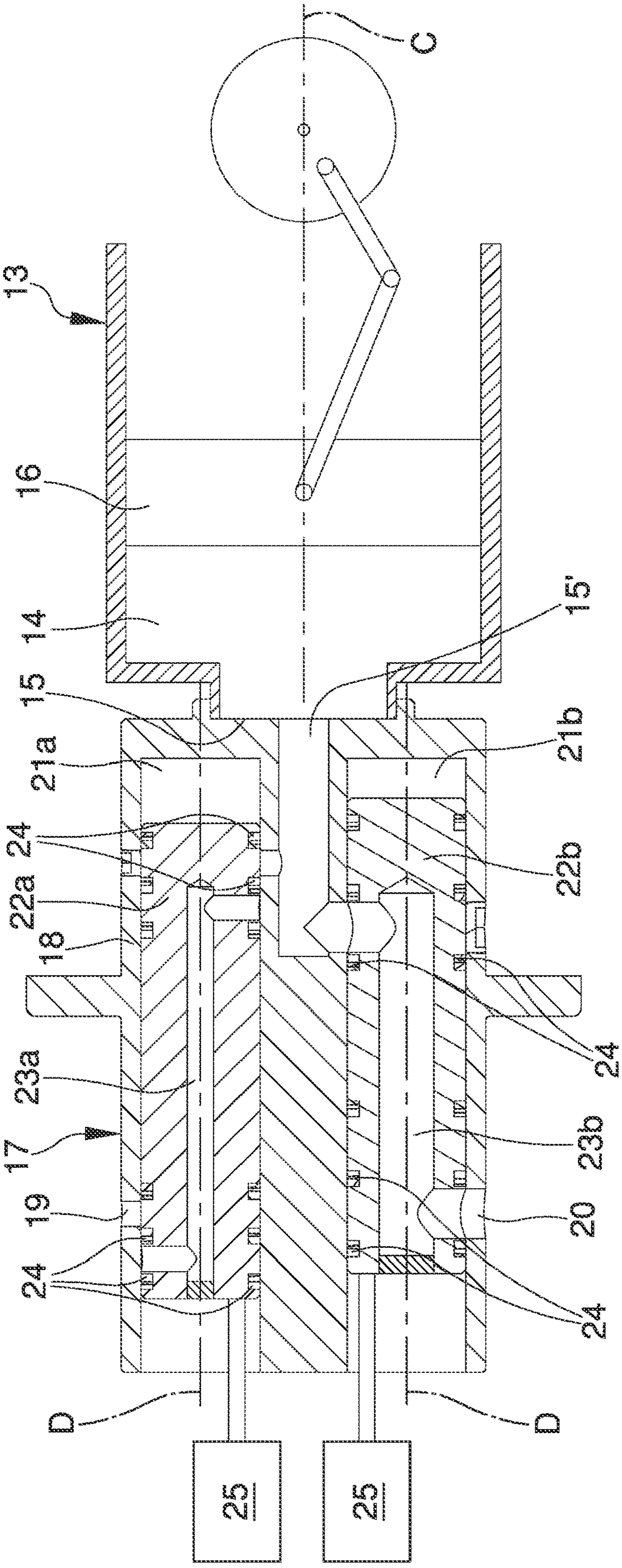
FIG. 7 is a schematic sectional view of the detail of FIG. 5 with the fluid-operated distributor in the discharge configuration.

The mouth 15 is opened again when the piston 16 is in the second position, then the piston 16 is brought back to the first position to push the liquefied methane out of the expansion chamber 14, as schematized in FIG. 5, reducing the volume of the latter to the least possible.

Advantageously, the piston expander 13 comprises a fluid-operated distributor 17 associated with the mouth 15 and adapted to control the flow direction of the methane.

In particular, the fluid-operated distributor 17 controls the opening and closing of the mouth 15 in a calibrated manner, so as to ensure that the liquefied methane is discharged only when the expansion has been completed.

Advantageously, the fluid-operated distributor 17 comprises:

- at least one valve body 18 comprising at least one sliding chamber 21*a*, 21*b* having a substantially elongated shape which extends along at least a second axial direction D and provided with at least one inlet opening 19 for the inlet of the gaseous methane, at least one discharge opening 20 for the discharge of the partially liquefied methane and at least one mouth opening 15' associated with the mouth 15 for the connection of the fluid-operated distributor 17 to the expansion chamber 14 of the piston expander 13;

at least one slider 22*a*, 22*b* having a substantially elongated shape, housed in the sliding chamber 21*a*, 21*b*, movable sliding along the second axial direction D and comprising at least one internal duct 23*a*, 23*b* wherein the methane flows and which can be placed in a fluid-operated connection with at least two of the inlet opening 19, the mouth opening 15' and the discharge opening 20.

The internal duct 23*a*, 23*b* has an elongated shape, i.e. it is considerably smaller in width than in length, providing greater resistance to the fluid-operated distributor 17 with respect to the high pressure of the fluid flowing through it.

Conveniently, the first axial direction C and the second axial direction D are substantially parallel to each other.

Thanks to this particular configuration, the piston expander 13 is substantially aligned with the fluid-operated distributor 17 and the expansion assembly B has very limited dimensions.

The possibility cannot however be ruled out of arranging the first axial direction C and the second axial direction D in a different manner.

Advantageously, the fluid-operated distributor 17 comprises a plurality of sliding chambers 21*a*, 21*b* and a plurality of sliders 22*a*, 22*b*, each of which being housed in a respective sliding chamber 21*a*, 21*b* and movable sliding in a substantially staggered manner with respect to each other along the second axial direction D.

In the particular embodiment shown in the figures, the fluid-operator distributor 17 comprises:

a first sliding chamber 21*a* in which a first slider 22*a* is housed, provided with a first internal duct 23*a;* a second sliding chamber 21*b* in which a second slider 22*b* is housed, provided with a second internal duct 23*b;* wherein the first slider 22*a* and the second slider 22*b* are movable sliding in a substantially alternate manner along the second axial direction D between:

a suction configuration in which the first internal duct 23*a* is placed in communication with the inlet opening 19 and the mouth opening 15';

an expansion configuration in which the first internal duct 23*a* and the second internal duct 23*b* are isolated with respect to the expansion chamber 14; and a discharge configuration in which the second internal duct 23*b* is placed in communication with the mouth opening 15' and with the discharge opening 20.

The first slider 22*a* and the second slider 22*b* are moved in a substantially synchronized manner with respect to the piston 16.

More particularly, when the compressed and cooled gaseous methane is conveyed into the expansion chamber 14, the piston 16 is in the first position and the fluid-operated distributor 17 is in the suction configuration, as in FIG. 3.

When the filling of the expansion chamber 14 has been completed, the fluid-operated distributor 17 is brought to the expansion configuration, as shown in FIG. 4, and closes the mouth 15 while the piston 16 starts moving towards the second position.

When the piston 16 reaches the second position and expansion has been completed, the fluid-operated distributor 17 is brought to the discharge configuration, as in FIG. 5, to allow the discharge of any liquefied methane and of the residual gaseous fraction, while the piston 16 starts moving again towards the first position.

The synchronization of the operations described above makes it possible to increase the efficiency of the expansion of the methane and, consequently, of the liquid fraction with respect to that which is still aeriform.

It is important to ensure a good seal in the fluid-operated distributor 17 in order to avoid gas leaks, therefore the fluid-operated distributor 17 is provided with a plurality of gaskets 24.

Advantageously, the fluid-operated distributor 17 comprises at least one motorized linear actuator 25 which is adapted to move the first slider 22*a* and the second slider 22*b* along the second axial direction D.

Preferably, the fluid-operated distributor 17 comprises two motorized linear actuators 25, adapted to move the first slider 22*a* and the second slider 22*b* respectively along the second axial direction D.

The motorized linear actuators 25 allow moving the first slider 22*a* and the second slider 22*b* entirely automatically and with great precision.

Alternative embodiments of the present invention cannot however be ruled out wherein the motorized linear actuators 25 are replaced by a motorized camshaft, which is provided with cams acting on the sliders 22*a*, 22*b* and which are shaped so as to synchronize the movement of the sliders 22*a*, 22*b* and ensure the correct operation of the fluid-operated distributor 17.

Conveniently, the expansion assembly B comprises a throttling valve 26 interposed between the piston expander 13 and the transfer section 12 and adapted to reduce the pressure of the methane leaving the piston expander 13.

More in particular, the throttling valve 26 is used to obtain a further reduction in the pressure of the liquefied methane leaving the piston expander 13: the reduction in pressure is accompanied by a further lowering of the temperature and by a further increase in the obtained liquid fraction.

The possibility cannot however be ruled out of making the expansion assembly B without the throttling valve 26, relying only on the expansion in the expansion chamber 14.

The liquefied methane now reaches the transfer section 12, through which it is conveyed outside the liquefaction assembly A and, in this case, to the first pipe 27.

The transfer section 12 can consist, e.g., of a simple tubular connecting section (i.e. a duct), the liquid methane coming out spontaneously from the liquefaction assembly by simple difference in pressure compared to the cryogenic storage tank 5. Alternatively, the transfer section 12 can consist of a pumping device, which therefore has an active function in pushing the liquid methane produced in the expansion assembly B towards the cryogenic storage tank 5.

As mentioned, the liquefaction assembly A comprises a series of components including the compressor 10, the cooling device 11 and the expansion assembly B.

Alternative embodiments cannot however be ruled out in which the liquefaction assembly A is made differently and consists, e.g., of a magnetocaloric cooler.

In other words, a sufficiently powerful magnetocaloric cooler can be made ready, at the inlet, to receive the gaseous methane coming from the supply 2 and to dispense, at the outlet, liquid methane to be conveyed to the cryogenic storage tank 5 and to the dispenser 3, without necessarily providing for additional cooling stages and additional thermal machines.

It has in practice been ascertained that the described invention achieves the intended objects.

In particular, the fact is underlined that the present filling station for means of transport permits considerably reducing fuel waste compared to known filling stations, since liquid methane can be produced directly from the gas conveyed by a gas pipeline and in small quantities, adapted to the needs of the moment.

Moreover, the supply of liquid methane is more practical, easier and functional and, at the same time, significantly reduces the amount of liquid methane that needs to be stored, thanks to the fact that the production of liquid methane can be regulated instantly.

In addition, the present filling station eliminates the need for supply by means of tanker trucks.

Finally, the present invention makes it easier to program the quantities of fuel to be stored, as the level of production and storage can be changed at any time.

The invention claimed is:

1. A filling station (1) for transport (4), wherein said filling station (1) comprises:

at least one supply (2) of a methane pipeline transporting gaseous methane;

at least one liquefaction assembly (A) connected in a fluid-operated manner to said at least one supply (2) and adapted to liquefy said gaseous methane conveyed by said methane pipeline to obtain liquid methane;

at least one dispenser (3) of said liquid methane, which is connected in a fluid-operated manner to said at least one liquefaction assembly (A) and is connectable in a removable manner to a means of transport (4) to supply said means of transport (4) with said liquid methane;

wherein said at least one liquefaction assembly (A) comprises:

at least one compressor (10) placed in fluidic connection with said at least one supply (2) and adapted to increase a pressure of said gaseous methane;

at least one cooling device (11) connected in a fluid-operated manner to said at least one compressor (10), adapted to cool said gaseous methane;

at least one expansion assembly (B) connected in a fluid-operated manner to said at least one cooling device (11), which is adapted to reduce the pressure of said gaseous methane to obtain said liquid methane;

at least one transfer section (12) connected in a fluid-operated manner to said at least one expansion assembly (B) and adapted to convey at least one of said liquefied methane and said gaseous methane outside said at least one liquefaction assembly (A);

wherein said at least one expansion assembly (B) comprises at least one piston expander (13) comprising at least one expansion chamber (14), which extends along a first axial direction (C), and provided with at least one suction and discharge mouth (15) and at least one piston (16), said at least one piston expander being housed in said at least one expansion chamber (14) and movable sliding inside said at least one expansion chamber (14) along said first axial direction (C);

wherein said at least one piston expander (13) comprises at least one fluid-operated distributor (17) associated with said mouth (15) and adapted to control the flow direction of said liquid methane;

wherein said at least one fluid-operated distributor (17) comprises:

at least one valve body (18) comprising at least one sliding chamber (21*a*, 21*b*) having an elongated shape which extends along a second axial direction (D) and provided with at least one inlet opening (19) for the inlet of said gaseous methane, at least one discharge opening (20) for the discharge of said liquefied methane and at least one mouth opening (15') associated with said mouth (15) for the connection of said at least one fluid-operated distributor (17) to said at least one expansion chamber (14) of said at least one piston expander (13);

at least one slider (22*a*, 22*b*) having an elongated shape, housed in said at least one sliding chamber (21*a*, 21*b*), movable sliding along said second axial direction (D) and comprising at least one internal duct (23*a*, 23*b*) wherein at least one of said liquefied methane and said gaseous methane flows and which can be placed in a fluid-operated connection with at least two of said at least one inlet opening (19), said at least one mouth opening (15') and said at least one discharge opening (20).

2. Filling station (1) according to claim 1, wherein said filling station (1) comprises at least one cryogenic storage tank (5) of said liquid methane interposed in a fluid-operated manner between said at least one liquefaction assembly (A) and said at least one dispenser (3).

3. Filling station (1) according to claim 2, wherein said at least one cryogenic storage tank (5) comprises pressurization means (6) of said liquid methane, which are adapted to pressurize said liquid methane inside said at least one cryogenic storage tank (5) to push said liquid methane towards said at least one dispenser (3).

4. Filling station (1) according to claim 2, wherein said filling station (1) comprises at least one pumping device (7) interposed in a fluid-operated manner between said at least one cryogenic storage tank (5) and said at least one dispenser (3) and adapted to push said liquid methane towards said at least one dispenser (3).

5. Filling station (1) according to claim 1, wherein said at least one dispenser (3) comprises at least one flow measurement device (8) adapted to measure a quantity of at least a portion of said liquid methane which passes through said at least one dispenser (3).

6. Filling station (1) according to claim 5, wherein said at least one dispenser (3) comprises at least one reading device (9) for the conversion of a quantity of at least a portion of said liquid methane which passes through said at least one dispenser (3) into a sum of money to be paid.

7. Filling station (1) according to claim 1, wherein said first axial direction (C) and said second axial direction (D) are parallel to each other.

8. Filling station (1) according to claim 1, wherein said at least one slider comprises a plurality of said sliders (21*a*, 21*b*), each of which is housed in a respective sliding chamber (21*a*, 21*b*) and movable sliding in a staggered manner with respect to each other along said second axial direction (D).

9. Filling station (1) according to claim 8, wherein said at least one fluid-operator distributor (17) comprises:

at least a first sliding chamber (21*a*) in which a first slider (22*a*) of the at least one slider is housed, provided with a first internal duct (23*a*);

at least a second sliding chamber (21*b*) in which a second slider (22*b*) of the at least one slider is housed, provided with a second internal duct (23*b*);

wherein said first slider (22*a*) and said second slider (22*b*) are movable sliding in a alternate manner along said second axial direction (D) between:

a suction configuration in which said first internal duct (23*a*) is placed in communication with said at least one inlet opening (19) and said at least one mouth opening (15');

an expansion configuration in which said first internal duct (23*a*) and said second internal duct (23*b*) are isolated with respect to said at least one expansion chamber (14); and a discharge configuration in which said second internal duct (23*b*) is placed in communication with said at least one mouth opening (15') and with said at least one discharge opening (20).

10. Filling station (1) according to claim 9, wherein said at least one fluid-operated distributor (17) comprises at least one motorized linear actuator (25) which is adapted to move at least one of said first slider (22*a*) and second slider (22*b*) along said second axial direction (D).

11. Filling station (1) according to claim 10, wherein said at least one fluid-operated distributor (17) comprises at least two of said motorized linear actuators (25) adapted to move said first slider (22*a*) and said second slider (22*b*) respectively along said second axial direction (D).

12. Filling station (1) according to claim 9, wherein said at least one fluid-operated distributor (17) comprises a motorized camshaft, provided with cams acting on said at least one slider (22*a*, 22*b*).

13. Filling station (1) according to claim 1, wherein said at least one expansion assembly (B) comprises at least one throttling valve (26) interposed between said at least one piston expander (13) and said at least one transfer section (12) and adapted to reduce the pressure of at least one of said liquefied methane and said gaseous methane leaving said at least one piston expander (13).

14. Filling station (1) according to claim 1, wherein said at least one cooling device (11) comprises at least one magnetocaloric cooler (34).

15. Filling station (1) according to claim 1, wherein said at least one liquefaction assembly (A) consists in a magnetocaloric cooler.

* * * * *